United States Patent
Lazaro et al.

(10) Patent No.: US 11,332,844 B2
(45) Date of Patent: May 17, 2022

(54) BATTERY-POWERED ELECTROPLATING BARREL AND METHODS OF USE

(71) Applicant: Hardwood Line Manufacturing Co., Chicago, IL (US)

(72) Inventors: Anton E. Lazaro, Evanston, IL (US); Frank Pusateri, Palatine, IL (US)

(73) Assignee: Hardwood Line Manufacturing Co., Chicago, IL (US)

( * ) Notice: Subject to any disclaimer, the term of this patent is extended or adjusted under 35 U.S.C. 154(b) by 144 days.

(21) Appl. No.: 16/260,915

(22) Filed: Jan. 29, 2019

(65) Prior Publication Data

US 2019/0242027 A1 Aug. 8, 2019

Related U.S. Application Data

(60) Provisional application No. 62/627,484, filed on Feb. 7, 2018.

(51) Int. Cl.
*C25D 17/20* (2006.01)
*C25D 17/22* (2006.01)

(52) U.S. Cl.
CPC ............. *C25D 17/22* (2013.01); *C25D 17/20* (2013.01)

(58) Field of Classification Search
None
See application file for complete search history.

(56) References Cited

U.S. PATENT DOCUMENTS

| | | | |
|---|---|---|---|
| 2,325,401 A | 7/1943 | Hurlston | 204/211 |
| 2,766,201 A | 10/1956 | Luther | 204/213 |
| 4,319,971 A | 3/1982 | Good et al. | 205/571 |
| 5,851,368 A | 12/1998 | Rumph | 204/213 |

FOREIGN PATENT DOCUMENTS

| | | | | |
|---|---|---|---|---|
| CN | 205653531 | | 10/2016 | ............ C25D 17/00 |
| DE | 19820060 | * | 11/1999 | ............ B01F 9/0034 |

OTHER PUBLICATIONS

English translation of CN205653531. (Year: 2016).*

* cited by examiner

*Primary Examiner* — Stefanie S Wittenberg
(74) *Attorney, Agent, or Firm* — David G. Rosenbaum; Rosenbaum IP

(57) ABSTRACT

Provided herein are systems, methods and apparatuses for a battery powered electroplating barrel and methods of use.

11 Claims, 4 Drawing Sheets

BATTERY-POWERED ELECTROPLATING BARREL AND METHODS OF USE

CROSS REFERENCE TO RELATED APPLICATIONS

The present application claims priority to U.S. provisional application Ser. No. 62/627,484, filed Feb. 7, 2018, herein incorporated by reference in its entirety.

BACKGROUND

The invention generally relates to electroplating barrels.

Electroplating barrels are well known for use in the electroplating of small objects, as in U.S. Pat. No. 5,030,330. The typical electroplating barrel has a perforated wall and is immersed in electrolyte solution while containing objects to be electroplated. The barrel is then rotated so that the objects tumble within the barrel while submerged in the electrolyte solution and then an electrical potential is placed across the electrolyte solution in a conventional manner to cause electroplating of the objects to take place.

U.S. Pat. No. 5,851,368 utilizes a battery yet has cables which need to be attached to both anode and cathode bars in an 'electrified' tank thus using the tanks Vdc power. This method of power transfer can in no way guarantee a specific barrel RPM as the voltage to those tanks was really meant to plate parts, not turn a barrel. The voltage then is set to ASF (amps/ft$^2$) for plating. This patent technically steals electrical power. The RPM is then variable as one can never be guaranteed of a specific voltage being delivered.

The present invention attempts to solve these problems, as well as others.

SUMMARY OF THE INVENTION

Provided herein are systems, methods and apparatuses for a battery powered electroplating barrel and methods of use. A Battery-Powered Electroplating Barrel apparatus is disclosed and generally comprises an electrical circuit operably coupled to a motor and a battery, wherein the electrical circuit provides a constant voltage to be delivered to the motor for operation of the motor at a constant RPM for an electroplating barrel; and a battery cartridge/holder operably coupled with the battery and an indicator operably coupled with the battery to display the constant voltage of the battery.

A method of providing power to an electroplating barrel apparatus is disclosed and generally comprises providing a battery operably coupled to an electrical switch; providing a constant voltage to a motor to operate the motor at a constant RPM; delivering the motor's constant RPM to an electroplating barrel; and displaying the constant voltage of the battery.

The methods, systems, and apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed.

BRIEF DESCRIPTION OF THE DRAWINGS

In the accompanying figures, like elements are identified by like reference numerals among the several preferred embodiments of the present invention.

DETAILED DESCRIPTION OF THE INVENTION

Figure 1A:
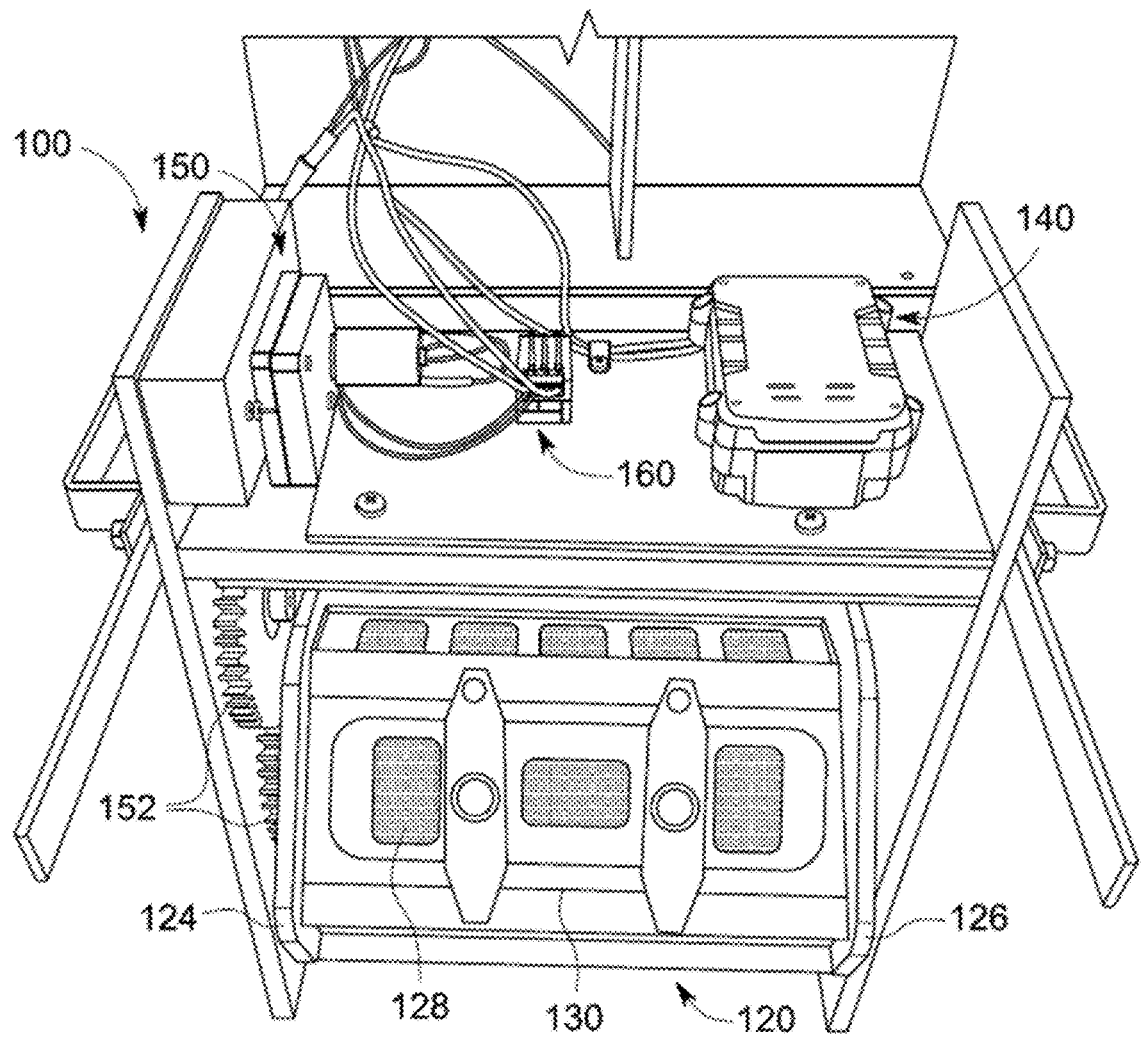
FIG. 1A is a perspective view of the electroplating barrel including a cover tilted back exposing wiring between the motor, the converter, and the battery.

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Embodiments of the invention will now be described with reference to the Figures, wherein like numerals reflect like elements throughout. The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein.

The use of the terms "a" and "an" and "the" and similar referents in the context of describing the invention are to be construed to cover both the singular and the plural, unless otherwise indicated herein or clearly contradicted by context. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Recitation of ranges of values herein are merely intended to serve as a shorthand method of referring individually to each separate value falling within the range, unless otherwise indicated herein, and each separate value is incorporated into the specification as if it were individually recited herein. The word "about," when accompanying a numerical value, is to be construed as indicating a deviation of up to and inclusive of 10% from the stated numerical value. The use of any and all examples, or exemplary language ("e.g." or "such as") provided herein, is intended merely to better illuminate the invention and does not pose a limitation on the scope of the invention unless otherwise claimed. No language in the specification should be construed as indicating any nonclaimed element as essential to the practice of the invention.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As used herein the term "method" refers to manners, means, techniques and procedures for accomplishing a given task including, but not limited to, those manners, means, techniques and procedures either known to, or readily developed from known manners, means, techniques and procedures by practitioners of the mechanical and electrical arts.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Generally speaking, the Battery-Powered Electroplating Barrel 100 comprises an electroplating barrel 120 that is rotatably driven and it is journalled by means of bearing members that are disposed in the center of the end plates 124, 126 and are rotatably driven by a motor 150 and gears 152 as seen in U.S. Pat. No. 4,740,286 as well as any number of previously built electroplating barrels. Generally, the electroplating barrels 120 reside in a bath of electrolyte solution of conventional design so as to permit the interior of the barrel 20 to be substantially filled with such solution, the solution passing into barrel 120 through the perforations 128 in the panels 130 of the barrel 120. An electrical potential is applied to the parts loaded in the barrel by means of the cathode points which are accessed to the barrel by means of insulated conductors that protrude through the bearing members of the end plates 124 and 126 and are connected to electrical power generating means in accordance with known ways for providing electroplating action to articles within the barrel 120.

Circular rotation of a barrel used for metal finishing i.e. plating, electroless process, cleaning, phosphating or black oxide is critical for uniformity of finish on each part. Not turning during critical tank positions will not allow liquid to reach all areas of the parts thus causing rejects. The rotational means of the cylinder is generated either from a motor attached to the barrel with or by the barrel making mechanical contact by means of an external drive shaft which extends out to a gear which mates with a gear on the tank of which is driven by a gear motor. Motors on the barrel require electrical power brought to the motor. It is usually delivered by means of either tank contacts or by an extension cord. Extension cords are technically illegal as they are dangerous and can cause injury.

Figure 1B:
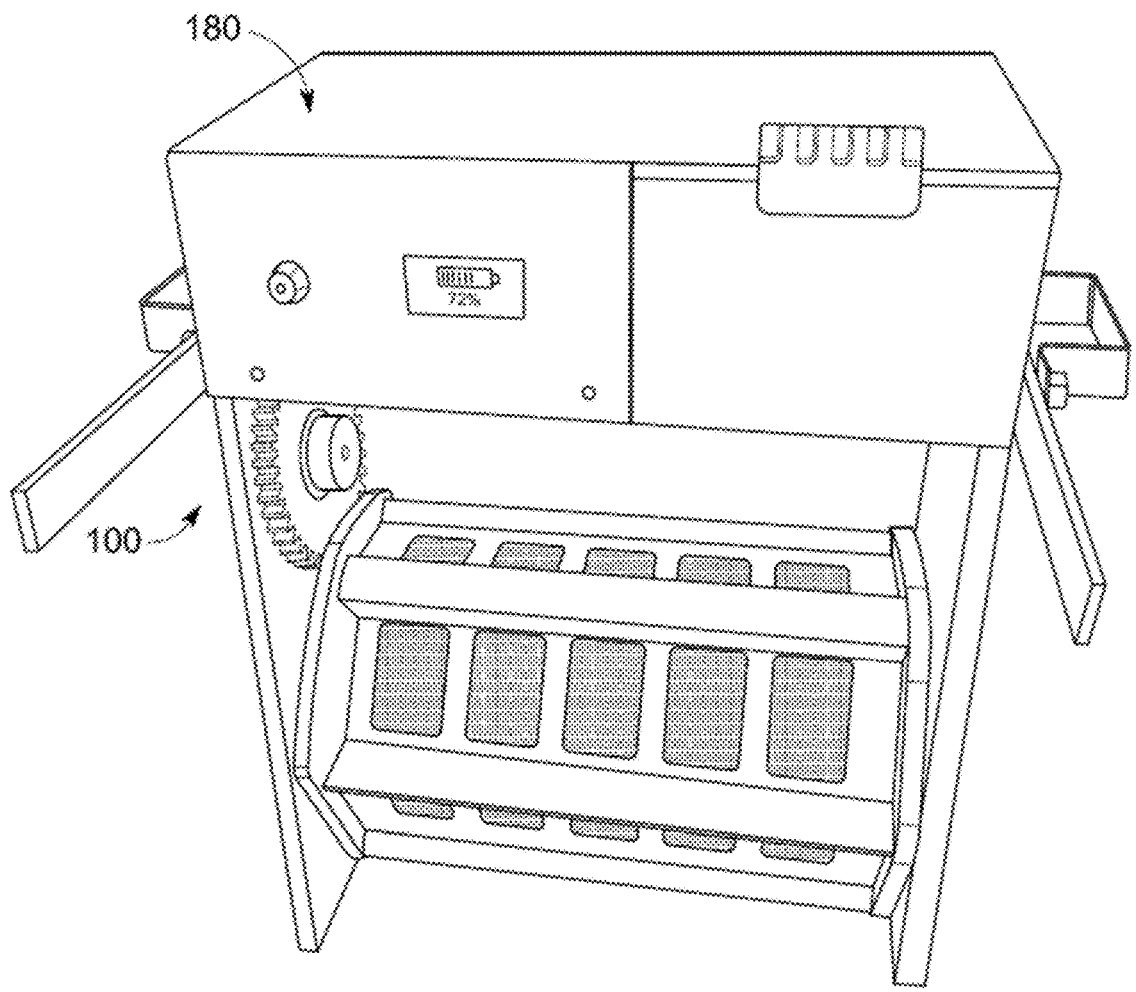
FIG. 1B is a perspective view of the electroplating barrel operably coupled with the cover including a switch & voltage display on the cover.
Figure 2A:
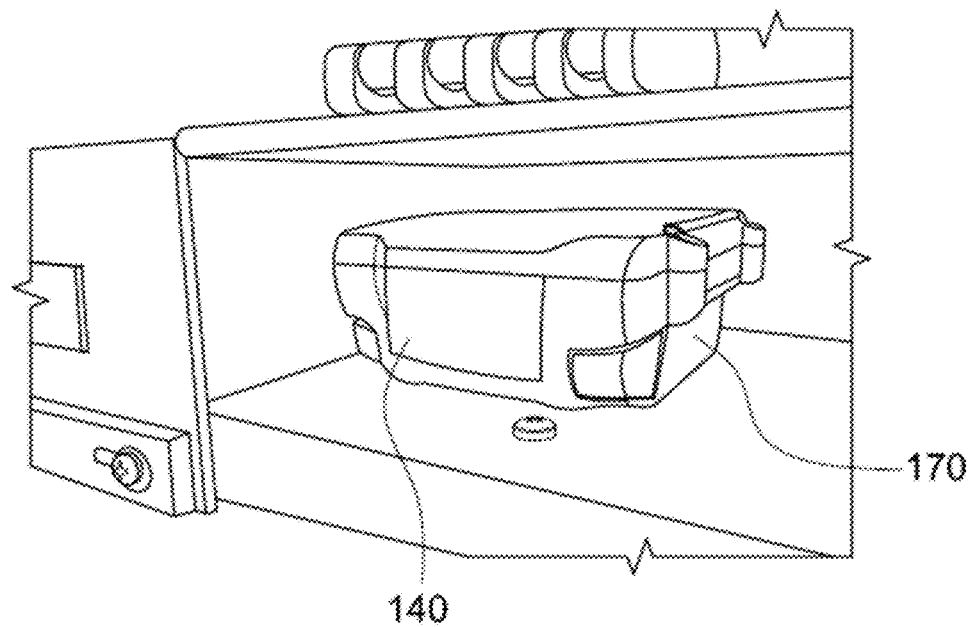
FIG. 2A is a side view of the battery with the cover raised exposing battery snapped into a holder.
Figure 2B:
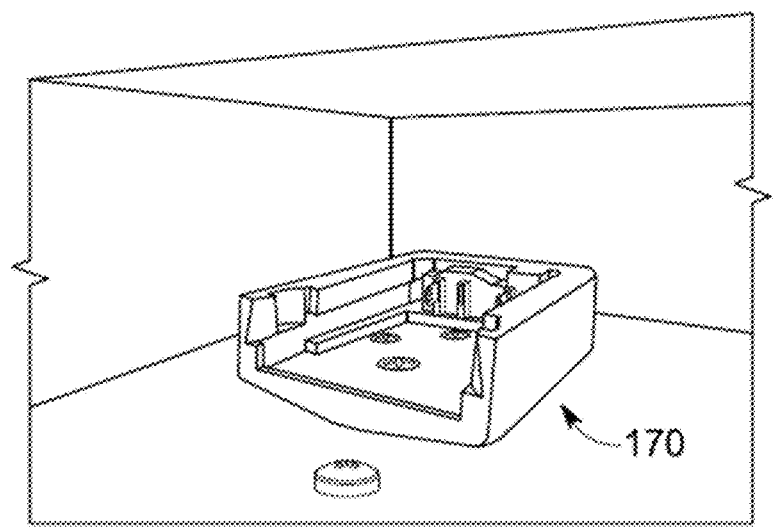
FIG. 2B is a side view of the battery with the cover raised and the battery removed from holder.

The Battery-Powered Electroplating Barrel 100 is operably coupled with a motor 150 to provide the torque and rotating power to the electroplating barrel 120. In one embodiment, a lithium ion battery 140 is operably coupled to a circuit 160 and the motor 150, where the electrical circuit 160 provides a constant voltage to the motor 150 in order to provide a constant rotational motion by the motor 150 for the electroplating barrel 120. A constant rotational motion or RPM is required for proper electroplating barrel operation. The battery may be disposed in a holder 170 and when the voltage of the battery decreases, an indicator 180 is provided on the cover, as shown in FIG. 1B, to indicate a threshold voltage in which the battery needs to be replaced. In one embodiment, the threshold is 16 V.

The Battery-Powered Electroplating Barrel 100 is operably coupled to the electrical circuit 160 that pulls amps from the battery and providing a constant voltage to the motor to provide a constant RPM to the electroplating barrel. A constant RPM guarantees plating uniformity. The RPM may range from about 2 to about 10 RPM; alternatively between about 1 to about 100 RPM. The constant RPM may be selected based upon the type of plating process being performed. The plating process include, but are not limited to: Copper plating, nickel plating, electroless nickel phosphorous, palladium plating, palladium-nickel, silver plating, tin, tin-lead, tin-zinc, zinc electroplating, zinc-nickel, soft and cobalt hardened gold including the SPC plating array.

The battery cartridge/holder 170 allows the battery 140 to be easily replaced when the indicator 180 tells the operator it's time to replace the battery. The electrical circuit 160 protects the battery 180 from surges as well as delivers constant voltage to the motor of which delivers a constant RPM. The battery holder holds the battery the same way as a charger and is part of the barrels electrical circuit.

The Battery-Powered Electroplating Barrel 100 operates in a metal finishing operation without the use of electrical cords or the need to have a contact block mounted in the tank along with fingers on the barrel. There are exposed voltage restrictions (usually 42 v) which protect humans from harm.

Figure 3:
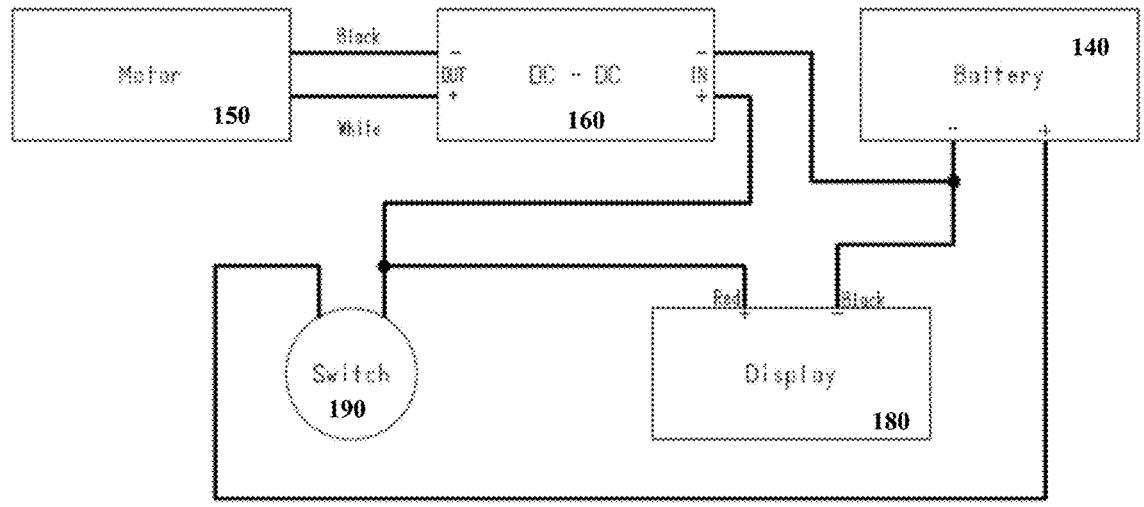
FIG. 3 is a schematic view of the electrical switch.

As shown in FIG. 3, the electrical circuit 160 is disposed between the battery 140 and the motor 150 allow the barrel to run for a predetermined period of time of which is based on models which factor in mass and weight of parts, desired RPM, sizing of motor and battery. The battery 140 is monitored by the display indicator 180 and a switch 190 turns on the battery 140 to power the motor 150. The predetermined period of time may between 20 minutes and 6 hours; alternatively between 50 minutes and 3 hour; alternatively between 100 minutes and 250 minutes. Multiple batteries can be wired in parallel to the electrical circuit 140, which offers increased battery life should there be a need.

The voltage from the battery first passes through the electrical circuit 160 where it is adjusted to meet a preset voltage of which is determined by torque ratings, loads to be revolved and the required RPM and amount of expected time the barrel needs to operate. The voltage display 180 is constantly monitoring and displaying the battery's condition.

Electrical Circuit

In one embodiment, the electrical circuit is a DC-DC circuit that allows the battery to deliver a constant preset voltage to the motor. An electric circuit is a path in which electrons from a voltage or current source flow. Electronic circuits usually use low voltage direct current sources. The load of an electronic circuit may be as simple as a few resistors, capacitors, and a lamp, or an electronic circuit can be complicated, connecting thousands of resistors, capacitors, and transistors. The electrical circuit may be an integrated circuit such as the microprocessor operably coupled to a computer.

A direct current circuit is an electrical circuit that consists of any combination of constant voltage sources, constant current sources, and resistors. In this case, the circuit voltages and currents are independent of time. A particular circuit voltage or current does not depend on the past value of any circuit voltage or current. This implies that the system of equations that represent a DC circuit do not involve integrals or derivatives with respect to time.

Battery

An electric battery is a device consisting of one or more electrochemical cells with external connections provided to power the electroplating barrel. When a battery is supplying electric power, its positive terminal is the cathode and its negative terminal is the anode. The terminal marked negative is the source of electrons that when connected to an external circuit will flow and deliver energy to an external device. When a battery is connected to an external circuit, electrolytes are able to move as ions within, allowing the chemical reactions to be completed at the separate terminals and so deliver energy to the external circuit. It is the movement of those ions within the battery which allows current to flow out of the battery to perform work. The term "battery" may refer to a device composed of multiple cells, or to include devices composed of a single cell.

A primary or secondary battery may be used. Primary batteries are designed to be used until exhausted of energy then discarded. Their chemical reactions are generally not reversible, so they cannot be recharged. When the supply of reactants in the battery is exhausted, the battery stops producing current and is useless. Secondary batteries can be recharged; that is, they can have their chemical reactions reversed by applying electric current to the cell. This regenerates the original chemical reactants, so they can be used, recharged, and used again multiple times.

One form of a secondary batteries include a lead-acid battery, which contains liquid electrolyte in an unsealed container, requiring that the battery be kept upright and the area be well ventilated to ensure safe dispersal of the hydrogen gas it produces during overcharging. Its high surge current levels make its capacity over approximately 10 Ah. Another form of a secondary battery is a sealed valve regulated lead-acid battery (VRLA battery). The VRLA battery uses an immobilized sulfuric acid electrolyte, reducing the chance of leakage and extending shelf life. VRLA batteries immobilize the electrolyte by a Gel batteries (or "gel cell") use a semi-solid electrolyte or an Absorbed Glass Mat (AGM) batteries absorb the electrolyte in a special fiberglass matting. Other portable rechargeable batteries include several sealed "dry cell" types. Cells of this type (in order of increasing power density and cost) include nickel-cadmium (NiCd), nickel-zinc (NiZn), nickel metal hydride (NiMH), and lithium-ion (Li-ion) cells.

Other batteries include USBCELL, nanoball batteries that allow for a discharge rate about 100× greater than current batteries, and smart battery packs with state-of-charge monitors and battery protection circuits that prevent damage on over-discharge.

Motor

In one embodiment, the motor is a DC motor. An electric motor is an electrical machine that converts electrical energy into mechanical energy. Most electric motors operate through the interaction between an electric motor's magnetic field and winding currents to generate force. Electric motors can be powered by direct current (DC) sources, such as from batteries, motor vehicles or rectifiers, or by alternating current (AC) sources, such as from the power grid, inverters or generators. Electric motors operate on three different physical principles: magnetic, electrostatic and piezoelectric. By far the most common is magnetic. All self-commutated DC motors run on DC electric power. Most DC motors are small permanent magnet (PM) types. They contain a brushed internal mechanical commutation to reverse motor windings' current in synchronism with rotation. In magnetic motors, magnetic fields are formed in both the rotor and the stator. The product between these two fields gives rise to a force, and thus a torque on the motor shaft. One, or both, of these fields must be made to change with the rotation of the motor. This is done by switching the poles on and off at the right time, or varying the strength of the pole.

Mathematical formulas were developed to factor in all critical areas needed to guarantee operation. It is then by design that a constant speed is maintained over a specified period of time. The Battery-Powered Electroplating Barrel 100 includes a unique circuitry that allows for a depleting Lithium Ion battery's power to be constantly matched with an output voltage to the motor.

The mathematical formulas may include constraints provided by customer and engineering design factors to achieve customer constraints. The constraints provided by customer may include, but are not limited to: Cylinder diameter, Cylinder revolutions per minute, Weight of parts load, Volume of parts load, Interval between battery charges. The engineering design factors to achieve customer constraints may include, but are not limited to: Barrel drive gear size, Barrel cylinder gear size, DC volts supplied to motor, Gearmotor nameplate volts, Gearmotor nameplate RPM, Gearmotor nameplate full load amps, Gearmotor nameplate full load torque, Battery pack voltage and ampere hour rating.

Given the cylinder diameter, the weight of parts of the load, and the volume of the parts of the load and various combinations of barrel drive gear size and barrel cylinder gear size are used to calculate required gearmotor output torque(s). The mathematical formulas consider the available DC gearmotors with a minimum required output torque at various volts for the DC volts supplied to the motor. The mathematical formulas consider the available DC gearmotors with output speed for the cylinder revolutions per minute given various barrel drive gear sizes and various barrel cylinder gear sizes. The mathematical formulas consider the available DC gearmotors with ampere draw that satisfy the Interval between battery charges given available Battery pack voltage and ampere hour rating. The mathematical formulas select the DC gearmotor that satisfies torque, speed and power draw. The mathematical formulas select the battery pack(s) to match the Interval between battery charges, the DC volts supplied to the motor, and the Battery pack voltage and ampere hour rating.

The mathematical formulas specify gears for the Barrel drive gear size and Barrel cylinder gear size, the gearmotor and battery pack to satisfy Cylinder diameter, Cylinder revolutions per minute, the Weight of parts load, the Volume of parts load, the Interval between battery charges when DC volts is supplied to the gearmotor.

Figure 4:
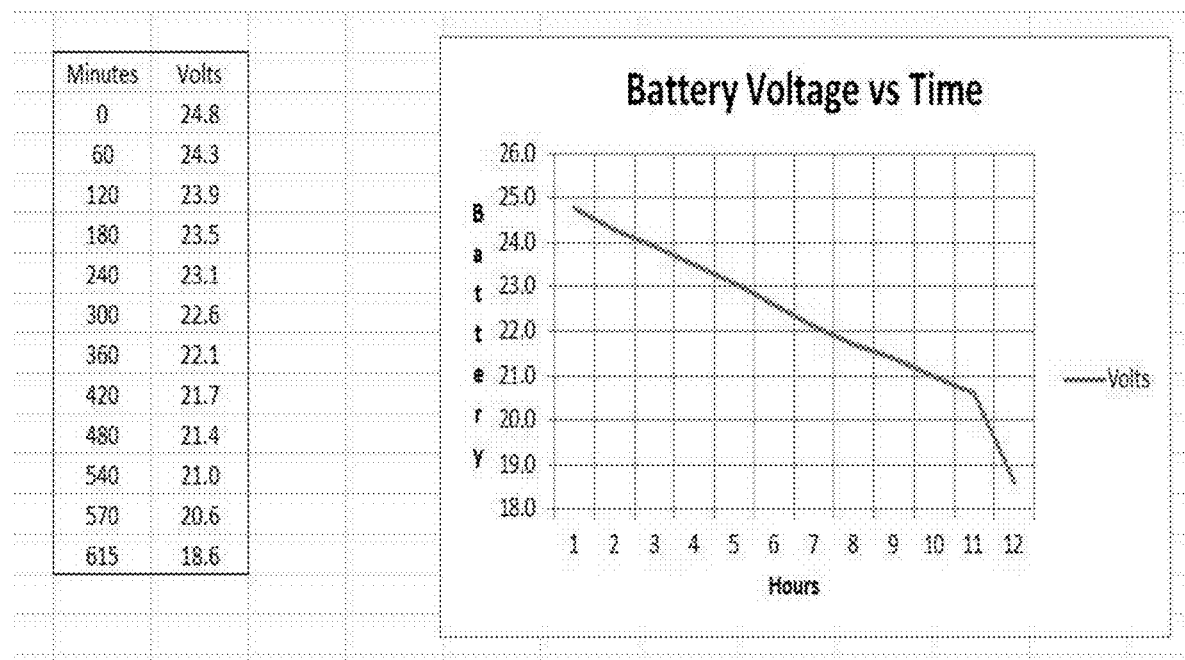
FIG. 4 is a graph of the testing RPM vs time where the graph shows voltage drop while operating the barrel at a constant speed over time.

As shown in FIG. 4, data was obtained by filling a barrel with parts and testing RPM vs time. The graph in FIG. 4 shows voltage drop while operating the barrel at a constant speed over time.

The electrical circuit is unique from any other known electrical wiring for barrels as it pulls amps from a battery to drive the motor which diminish the battery's power yet the circuitry provides a constant voltage to the motor which guarantees a constant barrel RPM. Constant RPM is critical to guaranty uniformity of plating thickness across the load.

The only way to have the barrel rotate at a constant speed is to utilize the as described electrical circuit. Installing a battery in a barrel without the electrical circuit cannot guarantee constant RPM. The success of guaranteeing a correct and constant RPM is by factoring weight of parts and filled to a percent of the capacity, torque rating on motor based on the gear train while matching capacities of motor and battery as a function of time. The battery's diminishing power over time is a key part of the calculation.

All publications and patent applications mentioned in this specification are herein incorporated by reference to the same extent as if each individual publication or patent application was specifically and individually indicated to be incorporated by reference.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. A method of uniformly coating a plating thickness to work pieces in an electroplating barrel, comprising the step of:
   a. providing a battery operably coupled to an electrical switch;
   b. outputting DC current at a first voltage from the battery to a DC-DC voltage regulator;
   c. adjusting the first voltage from the battery to a second voltage at the DC-DC voltage regulator;
   d. outputting the second voltage from the DC-DC voltage regulator to a motor, thereby operating the motor at a constant speed;
   e. coupling the motor's output to an electroplating barrel thereby rotating the electroplating barrel at a uniform rotational rate for the entire time duration of an electroplating thereby imparting uniformity of plating thickness to the work pieces in the electroplating process barrel; and
   f. displaying the first voltage from the battery on a display during the entire time duration of the electroplating process.

2. The method of claim 1, further comprising the step of controlling the uniform rotational rate of the electroplating barrel over the entire time duration of the electroplating process by maintaining a constant second voltage output from the DC-DC voltage regulator to the motor.

3. The method of claim 2, further comprising the step of controlling the second voltage output from the DC-DC voltage regulator to the motor in response to changes in the first voltage output from the battery, thereby maintaining the uniform rotational rate of the electroplating barrel.

4. The method of claim 3, wherein the step of controlling the second voltage output from the DC-DC voltage regulator further comprises a step of inputting data to the DC-DC voltage regulator from a microprocessor corresponding to one or more of electroplating barrel diameter, electroplating barrel speed, work piece load weight, work piece load volume, and/or time interval between battery charges or battery changes.

5. The method of claim 3, wherein a step of inputting data to the DC-DC voltage regulator from a microprocessor further comprises inputting data corresponding to one or more of electroplating barrel drive gear size, electroplating cylinder gear size, motor nameplate voltages rating, motor nameplate revolutions per minute rating, motor nameplate amperage rating, motor nameplate full load torque rating, battery voltage, and/or ampere hour rating.

6. The method of claim 1, further comprising the step of rotating the electroplating barrel at a constant rate within a range of about 2 to about 10 revolutions per minute.

7. The method of claim 6, further comprising the step of plating one or more of copper, nickel, nickel phosphorous, palladium, palladium-nickel, silver, tin, tin-lead, tin-zinc, zinc, zinc-nickel, cobalt hardened gold, and a self-polishing coating (SPC) plating array on the work pieces during the electroplating process.

8. The method of claim 4, further comprising the step of introducing an electrical circuit between the battery and the motor, the electrical circuit communicating with the microprocessor to control the DC-DC voltage regulator.

9. The method of claim 8, further comprising a computer in communication with the microprocessor to communicate data input at the computer to the microprocessor.

10. The method of claim 1, wherein the step of outputting the second voltage further comprises the step of outputting a constant voltage from the DC-DC voltage regulator and operating the motor at a constant speed based upon the constant voltage output from the DC-DC voltage regulator.

11. The method of claim 10, wherein the step of outputting a constant voltage from the DC-DC voltage regulator further comprises the step of adjusting the output constant voltage as the battery loses power.

* * * * *